(12) United States Patent
Goto et al.

(10) Patent No.: US 6,512,360 B1
(45) Date of Patent: Jan. 28, 2003

(54) SELF-INDUCTION-TYPE STROKE SENSOR

(75) Inventors: Atsutoshi Goto, Fuchu (JP); Kazuya Sakamoto, Hamura (JP); Hiroshi Sakamoto, Kawagoe (JP); Shoji Tozawa, Setagaya-ku (JP)

(73) Assignees: Amiteq Co., Ltd, Tokyo (JP); Shin Caterpillar Mitsubishi Ltd., Tokyo (JP)

( * ) Notice: Subject to any disclaimer, the term of this patent is extended or adjusted under 35 U.S.C. 154(b) by 57 days.

(21) Appl. No.: 09/653,424

(22) Filed: Aug. 31, 2000

Related U.S. Application Data (63) Continuation-in-part of application No. 09/525,281, filed on Mar. 14, 2000.

(30) Foreign Application Priority Data

| Mar. 15, 1999 | (JP) | ................................................ 11-69229 |
| Sep. 3, 1999 | (JP) | ............................................ 11-249755 |
| Sep. 3, 1999 | (JP) | ............................................ 11-249768 |

(51) Int. Cl.[7] ............................................... G01R 19/18
(52) U.S. Cl. .................................. 324/120; 324/207.17
(58) Field of Search ........................ 324/207.24, 207.16, 324/207.18, 120, 207.17; 92/5 R; 310/20, 12

(56) References Cited

U.S. PATENT DOCUMENTS

| 4,112,365 A | 9/1978 | Larson |
| 4,754,220 A | 6/1988 | Shimizu |
| 5,257,921 A | * 11/1993 | Clarke et al. ............. 418/201.2 |
| 5,434,459 A | * 7/1995 | Pinkerton ..................... 310/20 |
| 5,710,509 A | * 1/1998 | Goto et al. ............. 324/207.25 |

FOREIGN PATENT DOCUMENTS

| EP | 0 759 539 A1 | 2/1997 |
| EP | 0 795 738 A1 | 9/1997 |
| JP | 2-26003 | 7/1990 |
| JP | 10126241 | 5/1998 |
| JP | 10-153203 | 6/1998 |
| JP | 10170210 | 6/1998 |

* cited by examiner

*Primary Examiner*—Edward Lefkowitz
*Assistant Examiner*—Subhash Zaveri
(74) *Attorney, Agent, or Firm*—Morrison & Foerster LLP (57) ABSTRACT

Within a body, a sensor member, which has one end supported in a cantilever fashion adjacent a predetermined end of the body and has the other end extending into a space of the body, includes a coil section having a plurality of coil segments that are excitable in a same phase by a predetermined A.C. signal and sequentially arranged along a direction of linear movement of a movable member. The movable member has an inner space to permit entry of the sensor member into the movable member. Inner peripheral wall of the movable member defining the inner space includes a magnetism-responsive substance containing a magnetic or electrically-conductive material. Relative positions of the magnetism-responsive substance and the coil section vary in accordance with a stroke position of the movable member, in response to which respective inductance of the coil segments are caused to vary in such a manner that during movement of the magnetism-responsive substance from one end to the other of a particular one of the coil segments, a voltage across the particular coil segment is caused to progressively decrease or increase.

13 Claims, 7 Drawing Sheets

SELF-INDUCTION-TYPE STROKE SENSOR

RELATED APPLICATION

This application is a continuation-in-part application of our corresponding U.S. application Ser. No. 09/525,281 filed Mar. 14, 2000, which is now pending.

BACKGROUND OF THE INVENTION

The present invention relates generally to stroke sensors suitable for detecting a stroke position of a fluid-pressure cylinder or a spool position of a spool value, and particularly to stroke sensors of a type which includes a coil section to be excited by an A.C. signal and a magnetic substance or electric, conductor movable relative to the coil section. More particularly, the present invention concerns a self-induction-type stroke sensor that uses only primary coils excitable by a single-phase A.C. signal to produce A.C. output signals presenting amplitude function characteristics of a plurality of phases in response to a stroke position to be detected.

Hitherto, there have been known various types of position detector apparatus which are designed to detect a stroke position in a fluid-pressure cylinder or the like. Of these position detector apparatus, induction-type cylinder position detector apparatus using electromagnetic coils are known, for example, from Japanese Utility Model Publication No. HEI-2-26003. In each of such conventional induction-type cylinder position detector apparatus, raised and recessed portions or a pattern of magnetic substance or electric conductor are first formed on the surface of the piston rod, and then a given protective coating is applied to the piston rod surface having the raised and recessed portions or pattern of magnetic substance or electric conductor formed thereon. Specifically, the known apparatus are based on a phase-shift-type position detection scheme, where a plurality of primary coils are exited by plural-phase A.C. signals (e.g., sin $\omega t$ and cos $\omega t$) shifted from each other in electric phase and signals induced on secondary coils by the primary coils are synthesized together to produce a single secondary output signal such that an electric phase difference, from the exciting A.C. signals, of output signals from secondary coils indicates a position of the Piston to be detected.

With the conventional induction-type cylinder position detector apparatus having the piston rod surface formed to have raised and recessed portions or pattern of magnetic substance or electric conductor, however, manufacturing and processing of the piston rod is very cumbersome and time-consuming. Further, in this case, each piston rod must be manufactured and processed on a special order basis. For these reasons, a same position detector apparatus can not be applied to cylinders of various different types and sizes. Further, even with the processed piston rod having undergone the given coating process, the coating tends to peel off, after several years' use, due to sliding wear caused by repeated reciprocative movement of the piston rod, which would lead to poor durability of the piston rod.

To avoid the disadvantages of the conventionally-known induction-type cylinder position detector apparatus, a more sophisticated cylinder stroke position detector apparatus has been proposed, for example, in Japanese Patent Laid-open Publication No. HEI 10-153203. The proposed cylinder stroke position detector apparatus is characterized in that the piston rod has an inner space for entry therein a sensor structure so that the need for applying particular processing to the peripheral surface of the piston rod can be eliminated and various components of the detector apparatus can be readily shared between cylinders of various different sizes. Also, the proposed cylinder stroke position detector apparatus thus arranged can have increased durability to reliably avoid the possibility of undesired sliding wear. The sensor structure provided in the inner space of the piston rod includes both primary coils and secondary coils, and the coil structure has much room yet to be improved.

Namely, because the coil structure of the inductive-type position sensor employed in the conventional cylinder stroke position detector apparatus requires both the primary and secondary coils, the necessary number of the component parts in the apparatus significantly increases so that significant limitations would be encountered in reducing the manufacturing cost and size of the detector apparatus. There is also known a position detector of a type that is designed to measure self-inductance of the exciting coils and can reduce the necessary number of the coils; however, a phase variation amount corresponding to displacement of an object to be detected in this position detector can be obtained only within a very narrow range, and thus the position detector presents the problems that the measurement of the phase variation amount is, in fact, difficult and the detecting resolution is very low, so that it can never be suitable for practical use.

SUMMARY OF THE INVENTION

It is therefore an object of the present invention to provide a self-inductance-type stroke sensor which is compact in size and simple in structure, provides for a wider detectable stroke range and also achieves high-resolution detection even when displacement of an object to be detected is very minute.

In order to accomplish the above-mentioned object, the present invention provides an improved stroke sensor for detecting a stroke position of a movable member linearly movable relative to a main body within a space formed in the main body, which comprises: a sensor member having one end supported in a cantilever fashion adjacent a predetermined end of the main body and having another end extending into the space of the main body, the movable member having an inner space formed therein to permit entry of the sensor member into the movable member; a coil section having a plurality of coil segments excitable by a predetermined A.C. signal and sequentially arranged along a direction of linear movement of the movable member, the coil section being provided on one of the sensor member and an inner peripheral wall of the movable member defining the inner space; and a magnetism-responsive substance provided on other of the sensor member and the inner peripheral wall of the movable member defining the inner space in such a manner that the magnetism-responsive substance is movable relative to the coil section. Relative positions of the magnetism-responsive substance and the coil section vary in accordance with a stroke position of the movable member, in response to which respective inductance of the coil segments are caused to vary in such a manner that during movement of the magnetism-responsive substance from one end to the other of a particular one of the coil segments, a voltage across the particular coil segment is caused to progressively decrease or increase.

In the case where the present invention is applied as a stroke sensor for a fluid-pressure cylinder, the above-mentioned "body" corresponds to the cylinder body, and the above-mentioned "movable member" corresponds to the piston rod. In this case, the sensor member is supported at one end, in a cantilever fashion, adjacent a predetermined end of the cylinder body in such a way that its other end extends into the space of the cylinder body. Further, the piston and piston rod, i.e. the movable member, has an inner space formed therein to permit entry of the sensor member into the movable member. Such a structure is similar to what is disclosed in Japanese Patent Laid-open Publication No. HEI 10-153203 discussed above, which, as described therein, affords various benefits, such as simplification, enhanced durability, compactness and wider applications of the structure. Here, the stroke position detection is effected by detecting, in accordance with the induction principles, relative positions of the coil section and magnetism-responsive substance provided for relative displacement to the coil section, on the basis of output voltages corresponding to inductance variations of the individual coil segments that occur in response to changing relative positions of the coil section and magnetism-responsive substance. In the case where the present invention is applied as a spool valve position detector apparatus, on the other hand, the above-mentioned "movable member" corresponds to the spool.

As an example, the coil section is provided on the sensor member, in which case the magnetism-responsive substance is provided on the inner peripheral wall of the movable member defining the inner space. If the material of the movable member itself comprises a predetermined magnetism-responsive substance, then the inner peripheral wall of the movable member defining the inner space itself functions as the above-mentioned magnetism-responsive substance, which therefore can eliminate a need for providing a separate magnetism-responsive substance other than the inner peripheral wall. In case the material of the movable member itself does not comprise a predetermined magnetism-responsive substance, such a predetermined magnetism-responsive substance has to be separately provided on the inner peripheral wall of the movable member defining the inner space. Conversely, the coil section may be provided on the inner peripheral wall of the movable member defining the inner space provided on the sensor member and the magnetism-responsive substance may be provided on the sensor member, because the positional relationship between the coil section and the magnetism-responsive substance can be reversed without involving inconveniences.

Typically, the magnetism-responsive substance may comprises at least one of a magnetic material and an electric conductor. In the case where the magnetism-responsive substance comprises a magnetic material, as the magnetism-responsive substance moves closer to or deeper into any one of the coil segments, the self-inductance of the coil segment increases, and thus the voltage across (i.e., between the opposite ends of) the coil segment increases progressively during displacement of the tip of the magnetism-responsive substance from one end to the other of that coil. Here, because the plurality of coil segments are arranged in series along the displacement direction of the movable member that is the object of the position detection, progressively increasing (or progressively decreasing) variations in the respective voltages of the coil segments will occur sequentially as the magnetism-responsive substance moves relative to the coil section in response to the displacement of the object to be detected. Using combinations of the progressively increasing (or progressively decreasing) variations in the respective between-terminal voltages of the coil segments while regarding the voltage variations as variations in partial phase ranges of predetermined cyclic functions, there can be produced a plurality of A.C. output signals presenting amplitudes of predetermined cyclic function characteristics in accordance with the stroke position of the object to be detected. Namely, the plurality of A.C. output signals presenting amplitudes of predetermined cyclic function characteristics in accordance with the stroke position of the object to be detected can be produced by taking out the respective between-terminal voltages of the individual coil segments and performing addition and/or subtraction between the taken-out voltages of the coil segments to thereby provide combinations of the between-terminal voltages.

For example, a progressively-increasing variation curve of the voltage across one of the coil segments, which takes place during the movement of the magnetism-responsive substance from one end to the other of the coil segment, can be likened to a functional value variation within a 0°–90° range of the sine function. The progressively-increasing variation curve can be converted to a variation curve progressively decreasing from a predetermined level, by inverting the amplitude values to corresponding negative values and subjecting the inverted amplitude values to a voltage shift operation to add thereto predetermined levels (offset levels). Such a progressively-decreasing variation curve can be likened, for example, to a functional value variation within a 90°–180° range of the sine function. Thus, by performing appropriate addition and/or subtraction between the between-terminal voltages as necessary, the progressively-increasing variations of the between-terminal voltages sequentially occurring in serially-arranged four coil segments can be likened respectively to functional value variations within the 0°–90° range, 90°–180° range, 180°–270° range and 270°–360° range of the sine function. The sloping directions of the curves in the individual ranges and voltage shift offset levels can be controlled as necessary through appropriate analog arithmetic operations. In this way, there can be produced a first A.C. output signal presenting an amplitude of the sine function characteristics in accordance with the position of the object to be detected and a second A.C. output signal presenting an amplitude of the same function characteristics which is shifted in phase from the sine function by 90°.

As a preferred implementation, there may be produced two A.C. output signals presenting amplitudes of the sine and cosine function characteristics, respectively, in accordance with the position of the object to be detected. Generally speaking, if the position of the object to be detected is denoted by an angle $\theta$, the A.C. output signal of the amplitude presenting the sine function characteristics can be represented by "$\sin \theta \sin \omega t$", while the A.C. output signal of the amplitude presenting the cosine function characteristics can be represented by "$\cos \theta \sin \omega t$". These signals are similar in form to output signals from conventional position detector apparatus commonly called "resolvers" and can be used extremely usefully. For example, the present invention may include an amplitude-to-phase conversion section that receives the plurality of A.C. output signals generated by the analog arithmetic operation circuit and detects, from a correlation between the amplitude values in the plurality of A.C. output signals, particular phase values in the predetermined cyclic functions defining the amplitude values, to generate data indicative of the position of the movable member to be detected on the basis of the detected particular phase values.

In the case where the magnetism-responsive member comprises a good electric conductor such as copper, the self-inductance of the coil segments would decrease due to eddy-current loss, so that during movement of the magnetism-responsive substance from one end to the other of a particular one of the coil segments, a voltage across the particular coil segment is caused to progressively decrease. In this case too, the position detection can be effected in the same manner as the above-described case. The magnetism-responsive substance may be provided as a hybrid type which comprises a combination of the magnetic material and electric conductor. As another implementation, a permanent magnet may be used as the magnetism-responsive substance, and the coil segments may include a magnetic core. In such a case, as the permanent magnet, functioning as the magnetism-responsive substance, approaches any one of the coil segments, a portion of the magnetic core having come close to the permanent magnet gets magnetically saturated or supersaturated, which results in a progressive drop in the between-terminal voltage of the coil segment during displacement of the magnetism-responsive substance, i.e. the permanent magnet, from one end to the other of the coil segment.

Thus, the present invention arranged in the above-mentioned manner only requires primary coils and can eliminate a need for secondary coils, so that the present invention can provide a position detector apparatus which is compact and simple in structure. Further, the plurality of coil segments are arranged in series along the displacement direction of the object to be detected and variations in characteristics of the coil segments, i.e. progressively increasing (or progressively decreasing) variations in the respective between-terminal voltages of the coil segments, occur sequentially as the tip of the magnetism-responsive substance moves from one end to the other of any one of the coils. Thus, by taking out the respective between-terminal voltages of the coil segments and then combining them through addition and/or subtraction thereof, there can be readily produced a plurality of A.C. output signals that present respective amplitudes of predetermined cyclic function characteristics (e.g., two A.C. output signals that present respective amplitudes of the sine and cosine function characteristics) in response to a current position of the object to be detected; thus, a wider available phase angle range can be provided by the present invention. For example, the present invention permits detection over the full 0°–360° phase angle range, as described above. Further, by detecting, from a correlation between the amplitude values in the plurality of A.C. output signals, phase values in the predetermined cyclic functions (e.g., sine and cosine functions) defining the amplitude values, the present invention achieves high-resolution detection even when the displacement of the object to be detected is very minute.

BRIEF DESCRIPTION OF THE DRAWINGS

For better understanding of the objects and other features of the present invention, its preferred embodiments will be described in greater detail hereinbelow with reference to the accompanying drawings, in which.

DETAILED DESCRIPTION OF THE PREFERRED EMBODIMENTS

Figure 1:
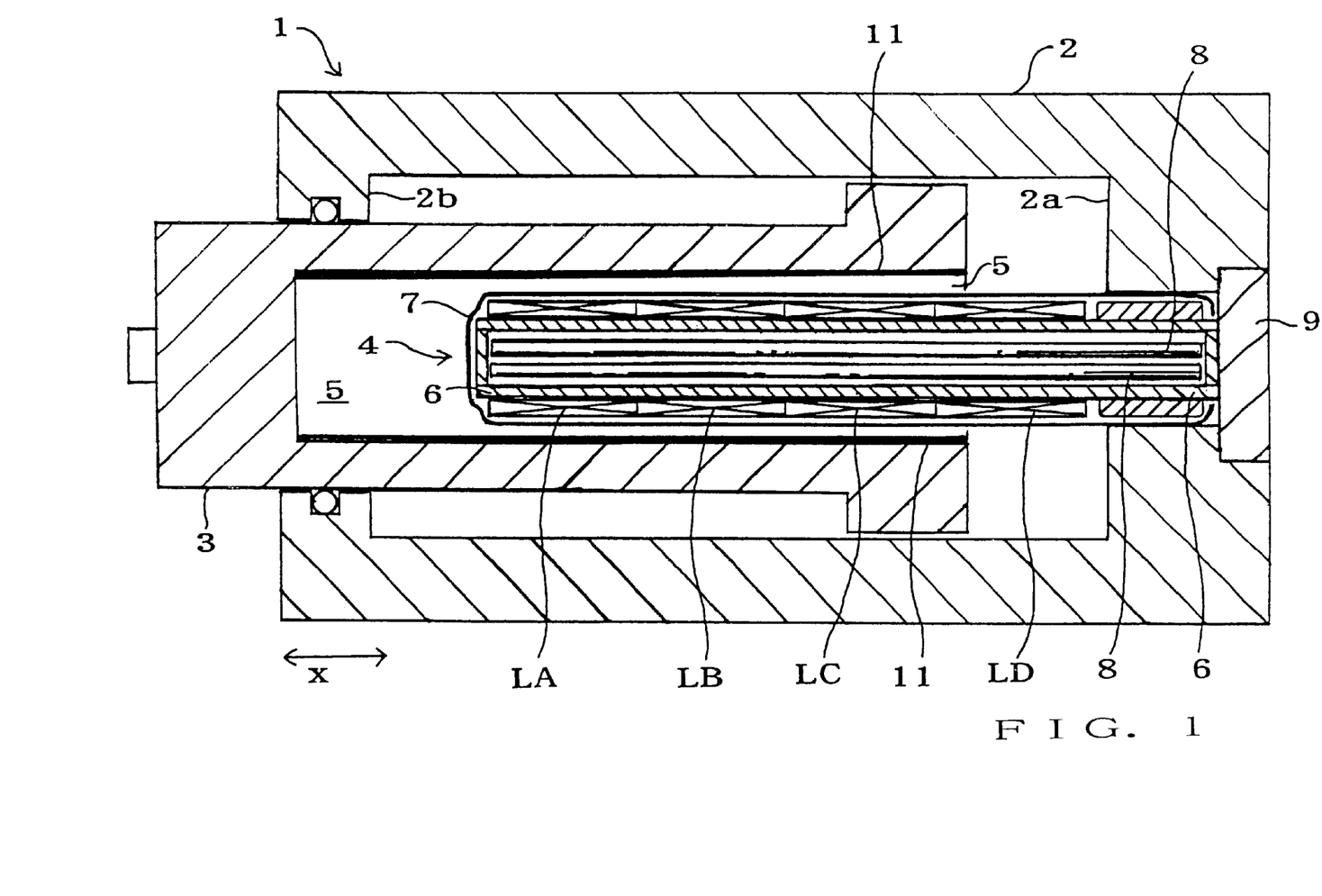
FIG. 1 is a schematic axial sectional view of a stroke sensor in accordance with an embodiment of the present invention which is applied to a fluid-pressure cylinder apparatus.

FIG. 1 shows a stroke sensor in accordance with an embodiment of the present invention which is arranged as a cylinder position detector apparatus, and more particularly, FIG. 1 is a sectional view of the cylinder position detector apparatus taken along the axis of the cylinder. Cylinder apparatus 1, to which the cylinder position detector apparatus of the present invention is applied, may be of any type, such as a hydraulic or pneumatic type. As conventionally known, the cylinder apparatus 1 includes a cylinder body 2 and a piston member 3 inserted in the cylinder body 2 for linear movement or displacement relative to the cylinder body 2. Note that illustration of a hydraulic or pneumatic circuit related to the cylinder body 2 is omitted for simplicity.

Within the cylinder body 2, an elongate sensor member 4 is supported at its one end, in a cantilever fashion, adjacent a closed end 2a of the cylinder body 2, and the sensor member 4 has another end extending into a space of the cylinder body 2 toward an open end 2b thereof. Therefore, the piston member 3 linearly moving back and forth in an "x" direction within the cylinder body 2 must appropriately avoid the elongate sensor member 4. Thus, a given inner space 5 is formed in the piston member 3 to permit free entry of the sensor member 4.

The sensor member 4 includes a coil section 10 having a plurality of coil segments (in the illustrated example, four coil segments LA, LB, LC and LD) that are excitable by a predetermined single-phase A.C. signal, and these coil segments are arranged in series along the linear movement direction x of the piston member 3. Specifically, the coil section 10 having the plurality of coil segments LA, LB, LC and LD is wound on a bobbin section 6, and has its outer periphery covered with a nonmagnetic or non-electrically-conductive protective tube (or coating or mold) 7. Although the protective tube 7 may be made of any appropriate material, it is preferred that the tube 7 be a thermally-contractive tube made of an insulative resin because of the low cost. Since the coil segments LA, LB, LC and LD are exited by the predetermined single-phase A.C. signal, they need not necessarily be physically-separated coils and may be formed of a substantially single coil as a whole. Namely, the single coil may be divided at a plurality of intermediate positions in correspondence with the coil segments LA, LB, LC and LD and output terminals or taps may be provided at the intermediate positions to thereby provide the coil segments LA, LB, LC and LD that are connected in series and excited by the predetermined single-phase A.C. signal. Of course, the present invention is not so limited, and the coil segments LA, LB, LC and LD may be separate coils that are connected in series and excited collectively by the predetermined single-phase A.C. signal or excited in same phase by a predetermined single-phase A.C. signal supplied via different exciting circuits. However, the simplest is the above-mentioned arrangement of dividing the single coil at a plurality of intermediate positions in correspondence with the coil segments LA, LB, LC and LD. Hereinafter, the coil segments LA, LB, LC and LD will each be referred to simply as a "coil".

The bobbin section 6 is in the form of a non-magnetic hollow cylinder, in which is received one or more magnetic rods 8. The rods 8 extend throughout the length of the coil section 10 and act to set an inductance value, i.e., impedance, along the entire length of the coil section 10. The setting of such an inductance value along the entire length of the coil section 10 can be changed as desired by appropriately adjusting the thickness and the number of the rods 8 received within the bobbin section 6. Preferably, each of the magnetic rods 8 is plated with copper or the like to provide an electrically-conductive coating on its peripheral surface so that the conductive coating helps to compensate temperature drift characteristics as will be later described. The bobbin section 6 may be formed of any suitable metal or resin as long as it is non-magnetic. However, in cases where the cylinder apparatus 1 employing the inventive sensor apparatus is applied to large construction machinery or the like that is subjected to relatively great loads, it is more preferable that the bobbin section 6 be formed of metal, such as non-magnetic stainless steel, to assure a sufficient mechanical strength. If a cap member 9 is provided at the cylinder's closed end 2a for closing and opening the cylinder body 2 and sealing the cylinder body 2 in a gas-tight and liquid-tight manner and also such an arrangement is made as to permit insertion and removal of the sensor member 4 to and from the cylinder by opening the cap member 9, installation of the sensor member 4 into the cylinder and maintenance of the sensor member 4 can be performed with great facility. Wires (not shown) of the coil section 10 are passed through a passage (also not shown) formed in an appropriate portion of the cylinder's closed end 2a (which may be, for example, a portion of the cap member 9) and coupled to a connector (also not shown) for contact with the outside.

Further, in the instant embodiment of the present invention, a predetermined magnetism-responsive substance 11 is provided on the inner peripheral wall surface of the piston member 3 defining the inner space 5. In FIG. 1, the magnetism-responsive substance 11 is shown in FIG. 1 in such a manner that the substance 11 can be visually distinguished from the magnetism-responsive material of the piston member 3. However, in the case where the piston member 3 is made of the same material as the magnetism-responsive substance 11, the inner peripheral wall surface of the piston member 3 itself is allowed to function as the magnetism-responsive substance 11 without providing a separate magnetism-responsive substance 11. If a magnetic material is used as the magnetism-responsive substance 11 and the piston member 3 itself is made of a ferromagnetic material such as iron, the inner peripheral wall surface of the piston member 3 itself is allowed to function as the magnetism-responsive substance 11 without providing a separate magnetism-responsive substance 11 as mentioned above; however, if the piston member 3 itself is made of a nonmagnetic material such as stainless steel, then a sleeve of a good electric conductor or ferromagnetic material is fitted on the inner peripheral wall surface of the piston member 3 defining the inner space 5 so that the sleeve can function as the predetermined magnetism-responsive substance 11. In such a case, the inner peripheral wall surface of the piston member 3 defining the inner space 5 may be plated with copper to provide the magnetism-responsive substance 11 of good electric conductivity.

Figure 2A:
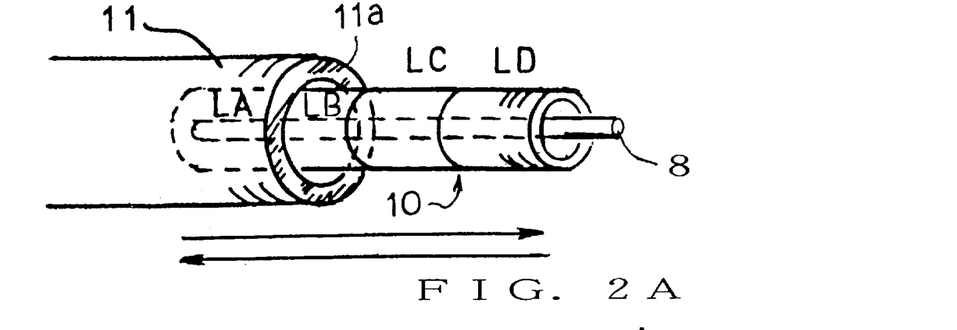
FIG. 2A is a schematic external view of the stroke sensor which is explanatory of position detecting principles on which the stroke sensor is based and which extractively shows an arrangement of a coil section and a magnetism-responsive substance shown in FIG. 1.
Figure 2B:
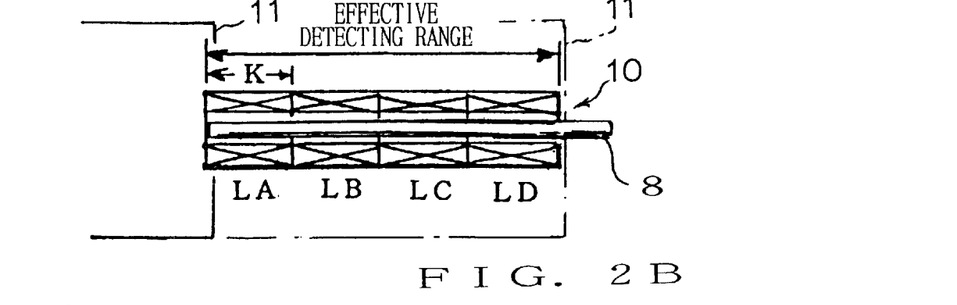
FIG. 2B is a schematic sectional view taken along the axis of the coil section.
Figure 2C:
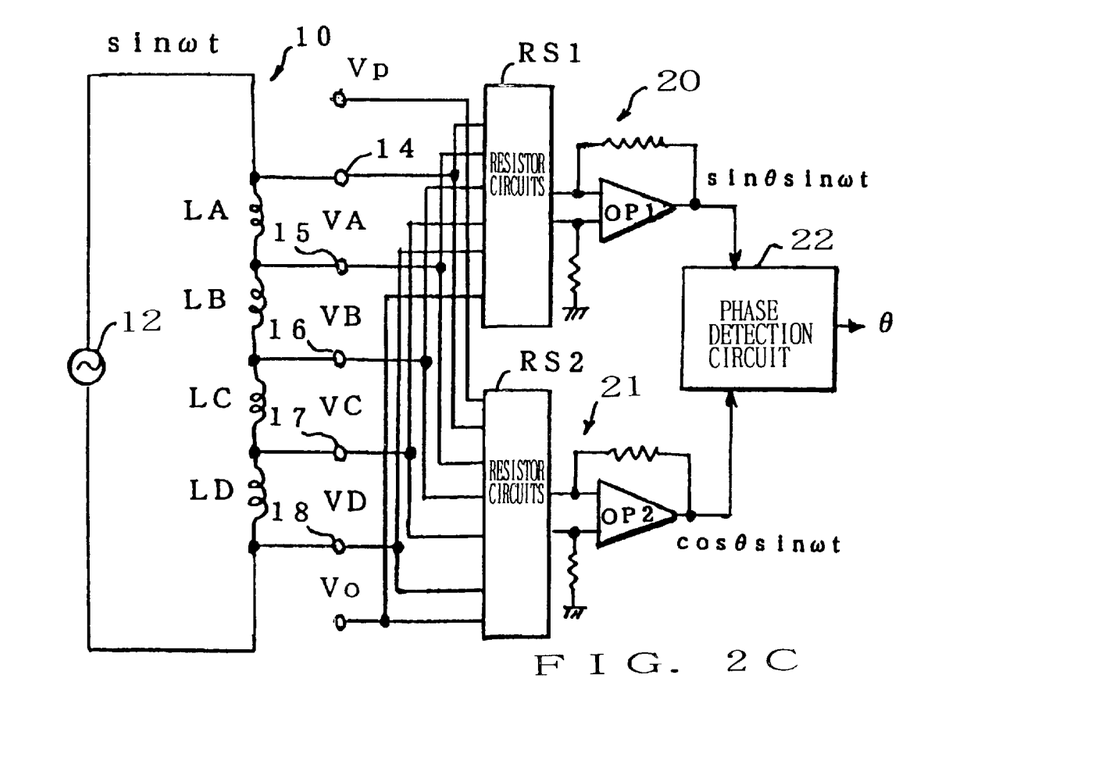
FIG. 2C is a block diagram showing an electric circuit associated with the coil section.

The following paragraphs describe the basic principles for detecting a relative positional relationship between the coil section 10 and the magnetism-responsive substance 11 in the instant embodiment. FIG. 2A is a schematic external view extractively showing an arrangement of or positional relationship between the coil section 10 and the magnetism-responsive substance 11 (the inner peripheral wall surface of the piston member 3) shown in FIG. 1, FIG. 2B is a sectional view taken along the axis of the coil section 10, and FIG. 2C is a block diagram showing an electric circuit associated with the coil section 10. The coil section 10 includes the four coils LA, LB, LC and LD, each having same characteristics, such as the same number of turns and the same coil length, arranged sequentially or in series along the direction of the linear movement of the piston member 3. As the piston member 3 moves in the contracting (retracting) direction, the rod-shaped sensor member 4 is caused to move, along the cylindrically-shaped magnetism-responsive substance 11 forming the inner peripheral wall surface, into the inner space 5 of the piston member 3, so that the magnetism-responsive substance 11 enters the respective magnetic fields of the individual coils of the coil section 10. In the illustrated example, as the magnetism-responsive substance 11 moves toward the rear end of the coil section 10, namely, rightward in the figure, in response to the movement of the piston section 3 in the contracting direction, the tip 11a of the magnetism-responsive substance 11 first enters the magnetic field of the leading coil LA and then enters the respective magnetic fields of the other coils LB, LC and LD sequentially in the order mentioned. A dot-and-dash line 11' in FIG. 2B depicts the magnetism-responsive substance 11 having completely entered as far as the magnetic field of the last coil (rightmost coil in the figure) LD. Axial ranges corresponding to the four coils LA, LB, LC and LD together constitute the effective detecting range of the sensor apparatus. Namely, if the length of each one of the coils is represented by K, the effective detecting range is equal to four times the length K, i.e. 4K. Note that because the detecting accuracy, in effect, tends to be lowered at opposite ends of the effective detecting range, the opposite ends of the effective detecting range is not used for the detection purpose in the instant embodiment, so that the actual length of the effective detecting range is a little shorter than 4K.

The one or more magnetic rods 8 extend axially through the respective core regions of the individual coils LA, LB, LC and LD. The one or more magnetic rods 8 present a maximum inductance value unless the magnetism-responsive substance 11 is located sufficiently close to the coil section 10. As the magnetism-responsive substance 11 moves closer to or further into the magnetic field of any one of the coils, the self-inductance of the coil decreases; thus, a voltage between the opposite ends of the coil decreases progressively as the tip 11a of the magnetism-responsive substance 11 is displaced from one end to the other of the coil in question. More specifically, in the case where the magnetism-responsive substance 11 is formed of a magnetic substance, the magnetic substance covers the outer periphery of the coil which has come to be surrounded by the magnetism-responsive substance 11 and thus a magnetic flux, having so far concentrated solely at the magnetic cores 8, namely, the rods 8, in the coil core region, leaks out to the magnetism-responsive substance 11, so that the self-inductance of the coil is caused to decrease. Further, in the case where the magnetism-responsive substance 11 is formed of an electrically-conductive substance, the conductive substance covers the outer periphery of the coil which has come to be surrounded by the magnetism-responsive substance 11 and thus an eddy-current loss occurs due to the magnetic field, which also causes the self-inductance of the coil to decrease. The use of the electrically-conductive substance as the magnetism-responsive substance 11 is more preferable because the rate of the inductance decrease caused by the eddy-current loss in the coil-surrounding conductive substance is greater that the rate of the inductance decrease caused by the magnetic flux leakage to the coil-surrounding magnetic substance.

As shown in FIG. 2C, the individual coils LA, LB, LC and LD are excited, at a constant voltage or current, by a predetermined single-phase A.C. signal (provisionally denoted by "sin ωt") generated by an A.C. power supply 12. Voltages between the respective opposite ends of these coils LA, LB, LC and LD are denoted in the figure by "VA", "VB", "VC" and "VD", respectively, and taps 14–18 are provided to take out these voltages VA, VB, VC and VD. As may be readily understood, the coils LA, LB, LC and LD need not necessarily be physically-separated coils, and they may be replaced by just a single continuous coil divided into four lengths or coil portions by the intermediate taps 14–18; that is, the coil portion between the taps 14 and 15 functions as the coil LA, the coil portion between the taps 15 and 16 functions as the coil LB, the coil portion between the taps 16 and 17 functions as the coil LC and the coil portion between the taps 17 and 18 functions as the coil LD. The output voltages VA, VB, VC and VD from the individual coils are delivered, in predetermined combinations, to two analog arithmetic operation circuits 20 and 21, in which they are subjected to an addition and/or subtraction based on predetermined mathematical expressions as will be later described in detail. Thus, these analog arithmetic operation circuits 20 and 21 produce two A.C. output signals of amplitudes that present sine and cosine function characteristics (i.e., two A.C. output signals having amplitude function characteristics phase-shifted from each other by 90°) corresponding to a current position of the object to be detected. For illustration purposes, the output signal from the analog arithmetic operation circuit 20 is denoted by sin θ sin ωt while the output signal from the other analog arithmetic operation circuit 21 is denoted by cos θ sin ωt. The analog arithmetic operation circuits 20 and 21 comprise operational amplifiers OP1, OP2 and resistor circuits RS1, RS2.

As mentioned earlier, as the magnetism-responsive substance 11 moves closer to or further into the magnetic field of any one of the coils, the self-inductance of the coil decreases, and thus the voltage between the opposite ends of the coil decreases progressively during displacement of the tip 11a of the substance 11 from one end to the other of the coil. Here, because the coils LA, LB, LC and LD are placed in series along the displacement direction of the to-be-detected object, progressive variations in the respective voltages VA, VB, VC and VD of the coils LA, LB, LC and LD will occur sequentially, as illustratively shown in part (A) of FIG. 3, as the magnetism-responsive substance 11 moves relative to the coils LA, LB, LC and LD in response to the displacement of the object to be detected. In part (A) of FIG. 3, a slope in each of the curves, indicative of the output voltages VA, VB, VC and VD from the coils LA, LB, LC and LD, represents a region where the tip 11a of the magnetism-responsive substance 11 is moving from one end toward the other of the coil in question. Typically, a progressive variation curve of the voltage between the opposite ends of the coil, which takes place during the movement of the magnetism-responsive substance 11 from the coil's one end to the other, can be likened to a functional value variation within a 90° angle of the sine or cosine function. Thus, by appropriately combining the output voltages VA, VB, VC and VD from the individual coils LA, LB, LC and LD and performing an addition and/or subtraction between the combinations, it is possible to produce two A.C. output signals sin θ sin ωt and cos θ sin ωt of amplitudes that present sine and cosine function characteristics corresponding to a current position of the object to be detected.

More specifically, the analog arithmetic operation circuit 20 can provide an A.C. output signal indicative of an amplitude curve of the sine function characteristic as shown in part (B) of FIG. 3, by performing arithmetic operations on the output voltages VA, VB, VC and VD from the coils LA, LB, LC and LD in accordance with Expression (1) below; the A.C. output signal from the analog arithmetic operation circuit 20 can be represented equivalently by "sin θ sin ωt".

$$(VB-VA)-(VD-VC)-Vo \qquad \text{Expression (1)}$$

Note that "Vo" represents a reference voltage corresponding to a minimum inductance value obtained when the magnetism-responsive substance 11 has covered the entirety of one of the coils and this reference voltage is used here to offset the output voltage to a zero level.

Further, the other analog arithmetic operation circuit 21 can provide an A.C. output signal indicative of an amplitude curve of the cosine function characteristic as shown in part (B) of FIG. 3, by performing arithmetic operations on the output voltages VA, VB, VC and VD from the coils LA, LB, LC and LD in accordance with Expression (2) below; the A.C. output signal from the analog arithmetic operation circuit 21 can be represented equivalently by "cos θ sin ωt".

$$VA+(VB-VC)+(Vp-VD)-Vo \qquad \text{Expression (2)}$$

Note that "Vp" represents a reference voltage corresponding to a maximum inductance value obtained when the magnetism-responsive substance 11 is not located sufficiently close to any one of the coils and this reference voltage is used here to offset the output voltage VD. Considering temperature drifts, generation of the reference voltages Vo and Vp had better be carried out using a suitable dummy coil so that these voltages Vo and Vp may be generated with the same temperature drift characteristics as those of the coils LA, LB, LC and LD. However, any other suitable temperature compensation means may of course be employed.

Phase angle θ in the sine and cosine functions, which are amplitude components of the individual A.C. output signals, corresponds to the current position to be detected, and a phase angle θ within the 90° range corresponds to the length K of one of the coils. Thus, the effective detecting range of the 4K length corresponds to a 0° to 360° range of the phase angle θ. Therefore, every position within the effective detecting range of the 4K length can be detected in an absolute value by detecting such a phase angle θ.

Now, an explanation is given below about compensation of the temperature characteristics. Impedance of the individual coils varies with a change in temperature, and such an impedance variation results in variations in the output voltages VA, VB, VC and VD from the individual coils. For example, as illustrated in part (A) of FIG. 3, each of the output voltages VA, VB, VC and VD would vary to increase or decrease in one direction, relative to a solid-line curve, as depicted by dotted line. However, in the A.C. output signals sin θ sin ωt and cos θ sin ωt of the sine and cosine function characteristics, obtained by the additive and subtractive syntheses of the output voltages, the variations would appear as positive and negative amplitude variations as shown by dotted lines in contradistinction with solid-line curves in part (B) of FIG. 3. If an amplitude coefficient A is used, they can be represented by A sin θ sin θt and A cos θ sin θt, and this amplitude coefficient A will vary with the ambient temperature. The amplitude coefficient variation appears similarly in the two A.C. output signals. As apparent from this, the amplitude coefficient A representative of temperature characteristics does not influence the phase angle θ in the sine and cosine functions. This means that compensation of the temperature drift characteristics has been duly achieved automatically in the instant embodiment without influencing the phase angle θ in the individual sine and cosine functions, and thus high-accuracy position detection can be provided by the position detector device. Further, the temperature drift compensation can be made by forming a conductive coating, such as copper plating, on the outer periphery of each of the magnetic rods 8 functioning as the magnetic cores of the coil section 10, as set forth above. More specifically, although the conductive coatings on the magnetic rods 8 act to reduce the inductance of the magnetic circuit due to the eddy-current loss generated therein, the eddy-current loss in the conductive coatings decreases to cause the inductance of the magnetic circuit to increase relatively as the coil impedance increases, for example, in response to a temperature increase (which, however, would involve a decrease in the self-inductance), which thus can compensate for the temperature drifts of the coil inductance. For the same reasons, a similar temperature drift compensation effect can be provided by using a more or less conductive substance as the non-magnetic metal of the bobbin section 6.

Every stroke position within the effective detecting range can be detected in an absolute value by means of the phase detection circuit (or amplitude-to-phase converting means) 22 which detects the phase component θ of the amplitude functions sinθ and cosθ in the A.C. output signals sin θ sin ωt and cos θ sin ωt of the sine and cosine function characteristics. The phase detection circuit 22 may be implemented such as by using a technique disclosed by the assignee of the present application in Japanese Patent Laid-open Publication No. HEI-9-126809 (corresponding to U.S. Pat. No. 5,710,509). For example, an A.C. signal sin θ cos ωt is generated by electrically shifting the first A.C. output signal sin θ sin ωt by 90°, and two A.C. signals sin(ωt+θ) and sin(ωt−θ) phase-shifted in a phase-advancing or phase-delaying direction in accordance with θ (i.e., signals having their phase components θ converted into A.C. phase shifts) are generated by additively and subtractively synthesizing this signal sin θ cos ωt and the second A.C. output signal cos θ sin ωt, in such a manner that data indicative of a detected stroke position (stroke position detecting data) can be obtained by measuring the phase θ. This phase detection circuit 22 may be implemented either by a dedicated circuit in the form of an LSI or by software processing using a CPU, processor, computer or the like. In an alternative, a conventionally-known R-D converter normally used for processing a resolver output may be used as the phase detection circuit 22. Detection of the phase component e in the phase detection circuit 22 may be performed by an analog process using an integration circuit and the like, rather than by a digital process. Alternatively, digital detecting data indicative of a rotational position θ may be generated by a digital phase detection process and then analog detecting data indicative of the rotational position θ may be obtained by converting the digital detecting data into analog representation. Of course, the A.C. output signals sin θ sin ωt and cos θ sin ωt from the arithmetic operation circuits 20 and 21 may be output directly without being processed by the phase detection circuit 22, in which case the detection circuit 22 may be omitted.

Figure 3:
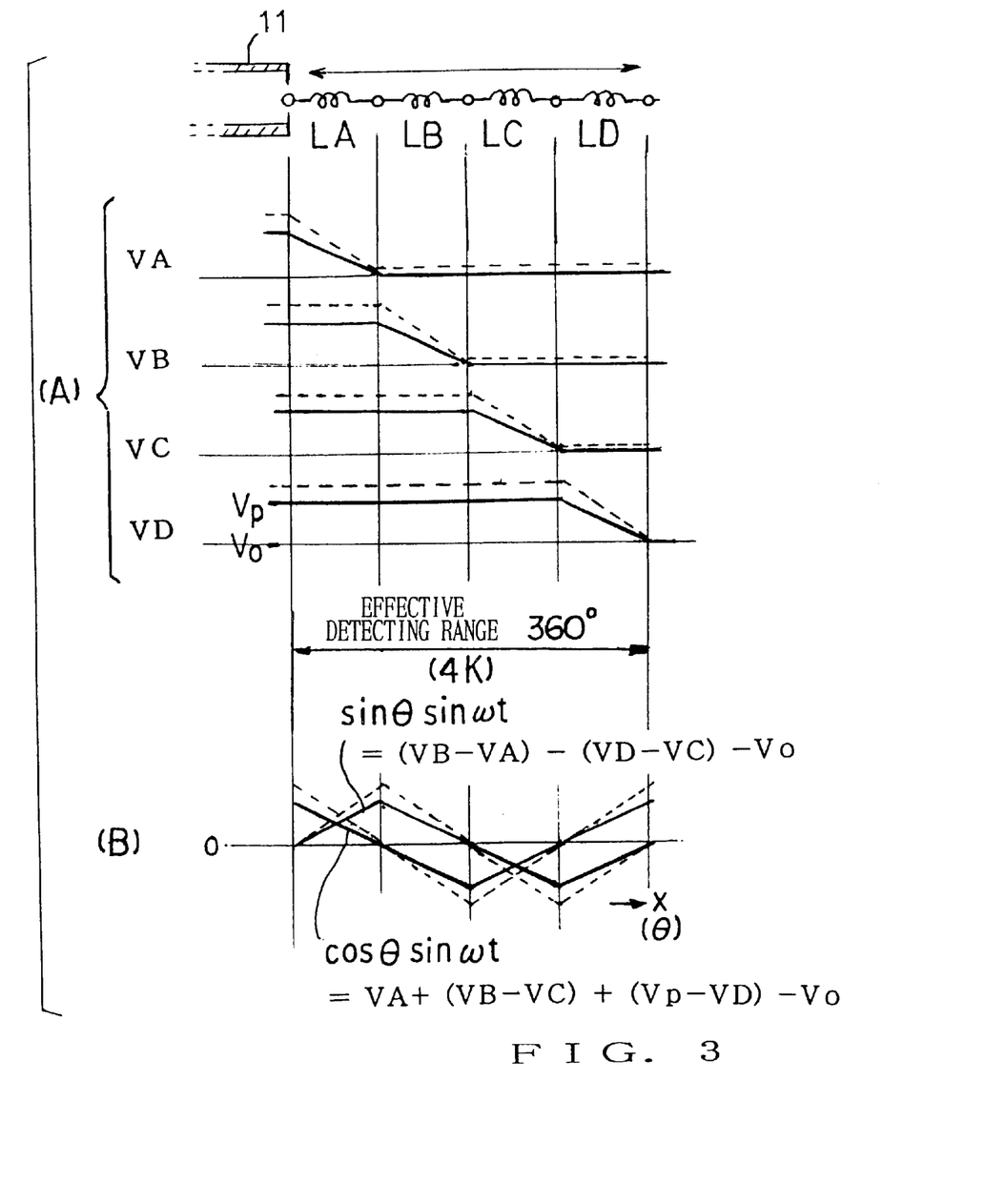
FIG. 3 is explanatory of position detecting operation of the embodiment shown in FIGS. 1 and 2, where part (A) is a diagram showing exemplary outputs from individual coils and part (B) is a diagram showing an example of arithmetical synthesis between the outputs from the individual coils.

If there is a linear correspondence between the phase angleθ and the position x of the object to be detected, the amplitudes in the A.C. output signals sin θ sin ωt and cos θ sin ωt of the sine and cosine function characteristics will not present real sine and cosine function characteristics, as shown in (B) of FIG. 3. However, the phase detection circuit 22 carries out the phase detection process on these A.C. output signals sin θ sin ωt and cos θ sin ωt as apparently having real sine and cosine function characteristics. As a result of this phase detection process, the detected phase angle θ will not present linearity with respect to the position x of the object to be detected. In detecting the position, however, the non-linearity between the detection output data (detected phase angle θ) and the actual position of the object to be detected does not matter very much. Namely, it is only necessary to be able to perform the position detection with predetermined repetitive reproducibility. Further, if necessary, the output data from the phase detection circuit 22 may be converted into other data form by use of an appropriate data conversion table so that accurate linearity can be readily provided between the detection output data and the actual position of the object to be detected. Accordingly, the "A.C. output signals sin θsin ωt and cos θ sin ωt having amplitude characteristics of the sine and cosine functions" referred to in connection with the present invention need not necessarily present real sine and cosine function characteristics; in effect, they may be something like those of a triangular waveform, as illustratively shown in (B) of FIG. 3, as long as they present such tendencies. In other words, it is only necessary that the sine and cosine functions in the present invention be periodic functions similar to trigonometric functions such as a sine function. In the illustrated example of (B) of FIG. 3, if the horizontal axis represents the phase angle θ and has given non-linear calibrations, even a function, apparently appearing as a triangular waveform when the horizontal axis calibrations are assumed to represent the positions x, can be said to be a sine or cosine function with respect to the phase angle θ.

Variation range of the phase component θ of the amplitude functions sin θ and cos θ in the A.C. output signals sin θ sin ωt and cos θ sin ωt of sine and cosine functions need not necessarily be the full 0°–360° range as in the above-described embodiment and may be a narrower angular range, in which case the coil construction can be significantly simplified. In the case where the effective detecting range can be narrowed, the detectable phase range may be any appropriate range less than 360°. There are various other cases where the detectable phase range can be any appropriate range below 360° depending on the intended purpose of detection, so that the narrower effective detecting range can be applied to any one of such cases as appropriate.

Figure 4:
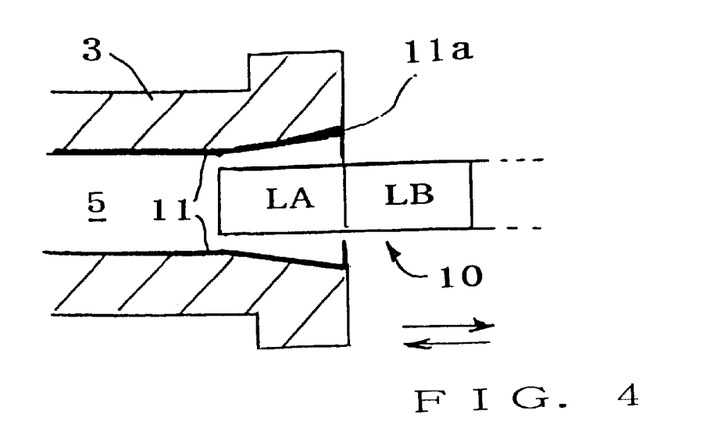
FIG. 4 is a schematic sectional view showing a modification of the magnetism-responsive substance shown in FIGS. 1 and 2, which particularly shows a modified shape of a tip portion of the magnetism-responsive substance.

FIG. 4 is a sectional view showing a modified arrangement of the magnetism-responsive substance 11. The inner space 5 of the piston member 3 is shaped to have a diameter progressively increasing in a direction toward an outlet opening thereof. Consequently, the magnetism-responsive substance 11 formed on the inner peripheral wall surface of the piston member 3 defining the inner space 5 is slanted in such a manner that the radial distance of the substance 11 from the sensor member 4, i.e. the coil section 10, progressively increases in a direction toward the tip 11a. The slanted range of the magnetism-responsive substance 11 may have an axial length substantially equal to the length K. The radial distance of the magnetism-responsive substance 11 from the coil section 10 varies in accordance with the slant, which causes a smooth or nonlinear inductance change; that is, the inductance change in the coil section 10, responsive to the movement of the tip 11a of the magnetism-responsive substance 11, can be made to have smooth or nonlinear progressively-decreasing characteristics.

Figure 5:
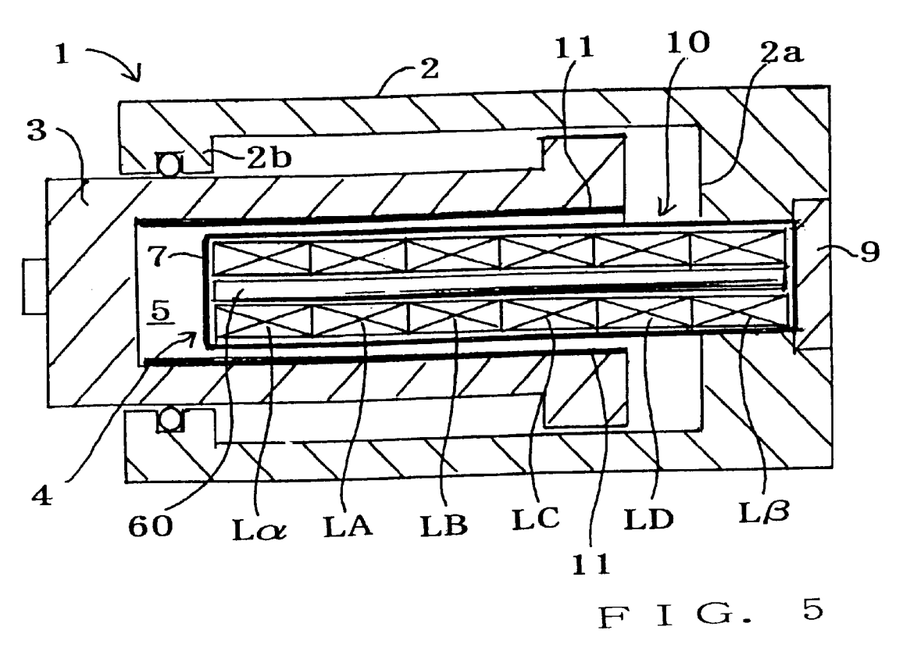
FIG. 5 is a schematic axial sectional view showing another embodiment of the stroke sensor in accordance with the present invention.

FIG. 5 is a sectional view showing another or second embodiment of the stroke sensor in accordance with the present invention, which is arranged in such a manner that as the magnetism-responsive substance 11 of the piston member 3 moves along the outer periphery of the coil section 10 toward the rear (right in the figure) end of the coil section 10, the coil inductance increases progressively. Namely, in this case, the bobbin section 60 is made of a nonmagnetic material while the magnetism-responsive substance 11 formed on the inner peripheral wall surface of the piston member 3 defining the inner space 5 is made of a ferromagnetic material. With this arrangement, as the magnetism-responsive substance 11 moves closer to or further into the magnetic field of any one of the coils in the coil section 10 due to the contracting stroke of the piston member 3, the self-inductance of the coil increases, and thus the voltage between the opposite ends of the coil increases progressively during the displacement of the tip of the substance 11 from one end to the other of the coil. In the stretching (projecting) stroke of the piston member 3, reverse operation to the above-mentioned takes place.

Further, in the illustrated example of FIG. 5, the coil section 10 further includes auxiliary coils $L\alpha$ and $L\beta$ before and after the coils LA, LB, LC and LD corresponding to the effective detecting range. The coil section 10 includes these six coils LA, LB, LC, LD and $L\alpha$, $L\beta$, each having same characteristics, such as the same number of turns and the same coil length, arranged sequentially along the direction of the linear movement of the piston member 3. The auxiliary coils $L\alpha$ and $L\beta$ are provided here in order to accurately acquire cosine function characteristics and thus may be dispensed with if very high detecting accuracy is not required.

In the embodiment of FIG. 5, the relative positional relationship between the coil section 10 and the magnetism-responsive substance 11 varies in response to a changing stroke position of the piston member 3 in substantially the same manner as in the first embodiment of FIG. 1. Namely, as the piston member 3 moves in the contracting (retracting) direction, the cylindrically-shaped magnetism-responsive substance 11 forming the inner peripheral wall surface of the piston member 3 causes the rod-shaped sensor member 4 to be introduced deeper into the inner space 5 of the piston member 3, so that the magnetism-responsive substance 11 sequentially enters the respective magnetic fields of the coils of the coil section 10. In the illustrated example of FIG. 5, as the magnetism-responsive substance 11 moves toward the rear end of the coil section 10, namely, rightward in the figure, in response to the movement of the piston section 3 in the contracting direction, the tip of the magnetism-responsive substance 11 first enters the magnetic field of the auxiliary coil $L\alpha$, then enters the respective magnetic fields of the other coils LA, LB, LC and LD, and finally enters the magnetic field of the auxiliary coil $L\beta$. However, in this embodiment, the bobbin section 60 is made of a nonmagnetic material with no magnetic material contained therein while the magnetism-responsive substance 11 formed on the inner peripheral wall surface of the piston member 3 defining the inner space 5 is made of a ferromagnetic material as noted earlier, so that as the magnetism-responsive substance 11 moves closer to or further into the magnetic field of any one of the coils, the self-inductance of the coil increases and thus the voltage between the opposite ends of the coil increases progressively during displacement of the tip of the substance 11 from one end to the other of the coil.

Figure 6:
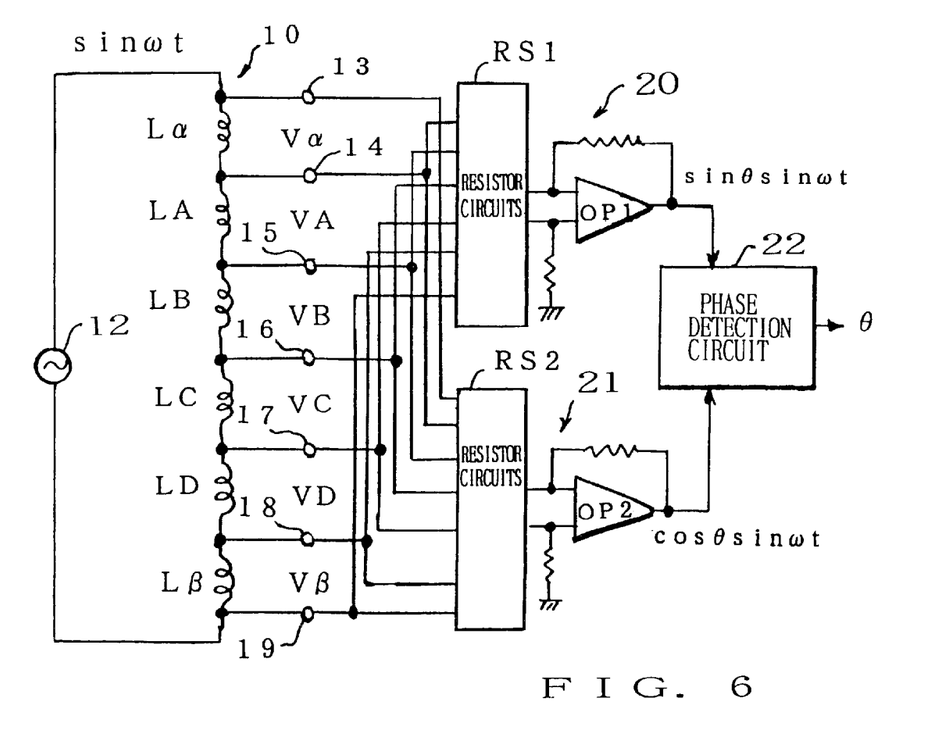
FIG. 6 is a block diagram showing an electric circuit associated with the coil section in the second embodiment of FIG. 5.

FIG. 6 shows an example of electric connection of the coil section 10 in the embodiment shown in FIG. 5. The individual coil segments $L\alpha$, LA, LB, LC, LD and $L\beta$ are excited, at a constant voltage or current, by a predetermined single-phase A.C. signal ("$\sin \omega t$") generated by an A.C. power supply 12. Voltages between the respective opposite ends (between-terminal voltages) of these coil segments $L\alpha$, LA, LB, LC, LD and $L\beta$ are denoted here by "$V\alpha$", "VA", "VB", "VC", "VD" and "$V\beta$", respectively, and intermediate output terminals or taps 13 - 19 are provided to take out these voltages $V\alpha$, VA, VB, VC, VD and $V\beta$. As in the above-described embodiment, the coil segments $L\alpha$, LA, LB, LC, LD and $L\beta$ need not necessarily be physically-separated coils, and they may be implemented by just a single continuous coil divided into six coil lengths or portions by the intermediate taps 13–19; that is, the coil portion between the taps 13 and 14 functions as the coil segment $L\alpha$, the coil portion between the taps 14 and 15 functions as the coil segment LA, the coil portion between the taps 15 and 16 functions as the coil segment LB, the coil portion between the taps 16 and 17 functions as the coil segment LC, the coil portion between the taps 17 and 18 functions as the coil segment LD, and the coil portion between the taps 18 and 19 functions as the coil segment $L\beta$. The output voltages $V\alpha$, VA, VB, VC, VD and $V\beta$ from the individual coil segments are delivered, in predetermined combinations, to two analog arithmetic operation circuits 20 and 21, in which they are subjected to an addition and/or subtraction based on predetermined mathematical expressions. Thus, these analog arithmetic operation circuits 20 and 21 produce two A.C. output signals $\sin\theta\sin\omega t$ and $\cos\theta\sin\omega t$ of amplitudes that present sine and cosine function characteristics corresponding to a current position of the object to be detected.

With the above-described arrangements, as the magnetism-responsive substance 11 moves closer to or further or deeper into any one of the coils, the self-inductance, i.e. impedance, of the coil increases, and thus the voltage between the opposite ends of the coil increases progressively during displacement of the tip of the magnetism-responsive substance 11 from one end to the other of that coil. Here, because the coils $L\alpha$, LA, LB, LC, LD and $L\beta$ are arranged in series along the displacement direction of the object to be detected, progressively increasing (progressively decreasing) variations in the respective voltages $V\alpha$, VA, VB, VC, VD and $V\beta$ of the coils $L\alpha$, LA, LB, LC, LD and $L\beta$ will occur sequentially, as illustratively shown in part (A) of FIG. 7, as the magnetism-responsive substance 11 moves relative to the coils in response to the displacement of the object to be detected. In part (A) of FIG. 7, a slope in each of the curves, indicative of the output voltage from any one of the coils, represents a region where the tip of the magnetism-responsive substance 11 is moving from one end toward the other of the coil in question. Typically, the progressively-increasing variation curve of the voltage between the opposite ends of the coil, which takes place during the movement of the tip 11a of the magnetism-responsive substance 11 from the coil's one end to the other, can be likened to a functional value variation within a 90° range of the sine or cosine function. Thus, by appropriately combining the output voltages Vα, VA, VB, VC, VD and Vβ from the coils Lα, LA, LB, LC, LD and Lβ and performing an addition and/or subtraction between the combinations, it is possible to produce two A.C. output signals sin θ sin ωt and cos θ sin ωt of amplitudes that present sine and cosine function characteristics corresponding to a current position of the object to be detected.

More specifically, the analog arithmetic operation circuit 20 shown in FIG. 6 can provide an A.C. output signal presenting an amplitude curve of the sine function characteristic as shown in part (B) of FIG. 3, by performing arithmetic operations on the output voltages VA, VB, VC and VD from the coils LA, LB, LC and LD in accordance with Expression (3) below; the A.C. output signal can be represented equivalently by "sin θ sin ωt".

$$(VA-VB)+(VD-VC) \quad \text{Expression (3)}$$

Figure 7:
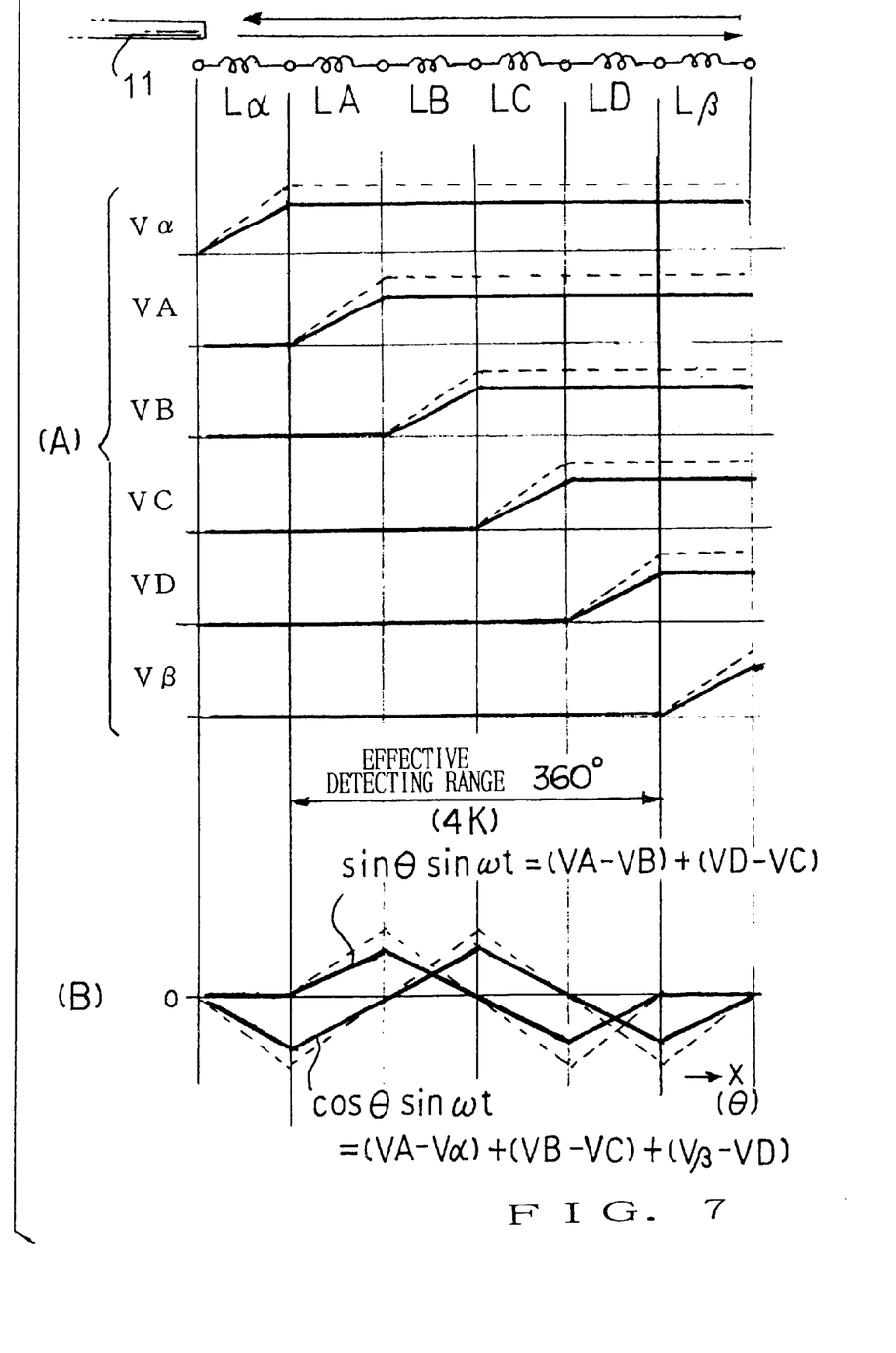
FIG. 7 is explanatory of position detecting operation of the second embodiment shown in FIG. 5, where part (A) is a diagram showing exemplary outputs from individual coils and part (B) is a diagram showing an example of arithmetical synthesis between the outputs from the individual coils.

Further, the other analog arithmetic operation circuit 21 shown in FIG. 6 can provide an A.C. output signal presenting an amplitude curve of the cosine function characteristic as shown in part (B) of FIG. 7, by performing arithmetic operations on the output voltages Vα, VA, VB, VC, VD and Vβ from the coils Lα, LA, LB, LC, LD and Lβ in accordance with Expression (4) below. Although the amplitude curve of the cosine function characteristic as shown in part (B) of FIG. 7, in effect, presents a minus cosine function characteristic, i.e., "–cos θ sin ωt", the amplitude curve corresponds to the cosine function characteristic since it presents a 90° shift relative to the sine function characteristic. Therefore, this can be said to be an A.C. output signal of the cosine function characteristic, which can be represented equivalently by "cos θ sin ωt".

$$(VA-V\alpha)+(VB-VC)+(V\beta-VD) \quad \text{Expression (4)}$$

Note that the following mathematical expression may be used instead of Expression (4) above:

$$(VA-V\alpha)+(VB-VC)-VD \quad \text{Expression (4')}$$

The A.C. output signal "–cos θ sin ωt" of the minus cosine function characteristic evaluated by Expression (4) may be electrically phase-inverted by 180° to thereby actually generate a signal of "cos θ sin ωt" for use as the A.C. output signal of the cosine function characteristic. However, in a situation where the A.C. output signal of the cosine function characteristic is used by a phase detection circuit 22 at a succeeding stage for a subtractive arithmetic operation in the form of "–cos θ sin ωt", the A.C. output signal "–cos θ sin ωt" of the minus cosine function characteristic can of course be used just as it is. Also note that the A.C. output signal "cos θ sin ωt" of the actual cosine function characteristic can be generated by performing the following mathematical expression instead of Expression (4):

$$(VA-V\alpha)+(VC-VB)+(VD-V\beta) \quad \text{Expression (4")}$$

The phase angle θ in the sine and cosine functions, which are the amplitude components of the individual A.C. output signals, corresponds to a current position of the object to be detected, and the phase angle θ within a 90° range corresponds to the length K of each one of the coils. Thus, the effective detecting range of the 4K length corresponds to a phase angle θ in the range of 0° to 360°. Therefore, every position within the effective detecting range of the 4K length can be detected in an absolute value by detecting such a phase angle θ.

Compensation of the temperature drift characteristics in the embodiment of FIG. 5 is also achieved in the same manner as in the embodiment of FIG. 1. The temperature drift characteristics are as illustrated in part (A) of FIG. 7, and each of the output voltages would vary to increase or decrease in one direction as depicted by dotted line in contradistinction to a solid-line curve. However, in the A.C. output signals sin θ sin ωt and cos θ sin ωt of the sine and cosine function characteristics, obtained by the additive and subtractive syntheses of the output voltages, the variations would appear as positive and negative amplitude variations as shown by dotted lines in contradistinction with solid-line curves in part (B) of FIG. 7. If an amplitude coefficient A is used, the A.C. output signals can be represented as A sin θ sin ωt and A cos θ sin ωt, respectively, and it is this amplitude coefficient A that varies in response to a change in ambient temperature. As may be clear from this, the amplitude coefficient A indicative of the temperature characteristics does not influence the phase angle θ in the sine and cosine functions. Thus, in the present embodiment, temperature characteristics can be duly compensated in an automatic fashion, to thereby achieve high-accuracy position detection.

Every position of the object to be detected can be detected as an absolute value by the phase detection circuit (or amplitude-to-phase converting means) 22 measuring the phase component θ of the amplitude functions sinθ and cosθ in the A.C. output signals sin θ sin ωt and cos θ sin ωt of the sine and cosine functions.

Figure 8:
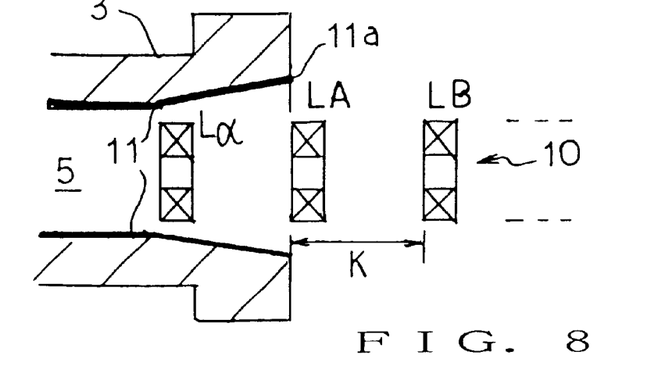
FIG. 8 is a schematic sectional view showing a modified shape of the tip portion of the magnetism-responsive substance and a modified arrangement of the coils.

FIG. 8 is a schematic sectional side view showing other examples of the coil section 10 and magnetism-responsive substance 11. In this case, the coils Lα, LA–LD and Lβ are spaced from each other with a pitch K as in the example of FIG. 5, but each of the coils is smaller in length than that in the examples of FIGS. 1 and 5. Namely, the adjoining coils Lα, LA–LD and Lβ need not be so close to each other as in the examples of FIGS. 1 and 5 and may be spaced from each other as appropriate. The inner space 5 of the piston member 3 is shaped to have a diameter progressively increasing in a direction toward an outlet opening thereof. Consequently, the magnetism-responsive substance 11 formed on the inner peripheral wall surface of the piston member 3 defining the inner space 5 is slanted in such a manner that the radial distance of the substance 11 from the sensor member 4, i.e. coil section 10, progressively increases in a direction toward the tip 11a. The slanted range of the magnetism-responsive substance 11 has an axial length substantially equal to the length K. In accordance with the slant of the magnetism-responsive substance 11, the radial distance or gap size of the substance 11 relative to the coils progressively varies so that smooth inductance variations occur in the coils. Namely, the coil inductance variations responsive to the movement of the tip 11a of the magnetism-responsive substance 11 can have smooth, progressively-increasing (or progressively-decreasing) characteristics. Of course, even in the case where the coils Lα, LA–LD and Lβ are placed close to each other as in the examples of FIGS. 1 and 5, the magnetism-responsive substance 11 may be formed to be slanted over a predetermined range from its tip 11a as shown in FIG. 8, as previously set out in relation to FIG. 4. Further, even where the magnetism-responsive substance 11 formed on the inner peripheral wall surface of the piston member 3 has no slanted portion as in the examples of FIGS. 1 and 5, the adjoining coils Lα, LA–LD and Lβ can be spaced from each other as appropriate as shown in FIG. 8.

Figure 9:
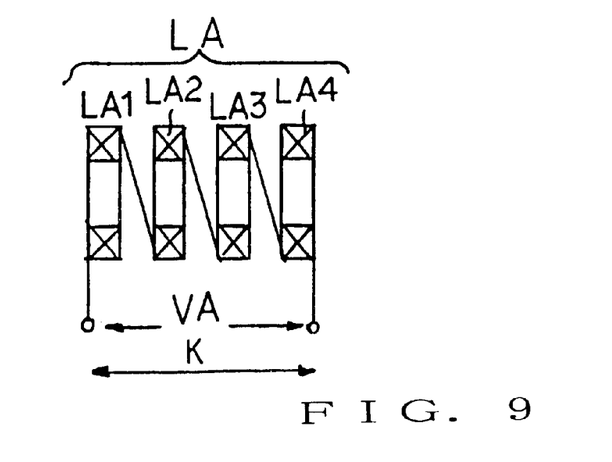
FIG. 9 is a schematic sectional view showing still another modified arrangement of the coils.

As a further modified example, each of the coils in the coil section 10 may comprise a plurality of separate coil segments. FIG. 9 shows an exemplary arrangement of the separate coil segments, in which one coil LA is composed of four spaced-apart coil segments LA1, LA2, LA3 and LA4 together covering the length of K. These coil segments LA1, LA2, LA3 and LA4 are connected in series with each other to produce a between-terminal voltage VA of the coil LA. In this case, the coil segments LA1, LA2, LA3 and LA4 may be either identical to or different from each other in the number of coil turns. Further, the coil segments LA1, LA2, LA3 and LA4 may be spaced apart at uniform or non-uniform intervals as desired. By employing different numbers of coil turns and non-uniform intervals between the coil segments (non-linear arrangements), etc., there can be produced impedance variations with characteristics closer to a sine or cosine function curve, which can lessen the above-mentioned non-linearity between a detected phase angle θ and an actual distance (position) of the object to be detected. Similarly, even where the coils Lα, LA–LD and Lβ are located close to each other as in the example of FIGS. 1 and 5, the number of coil turns over the length K of the coil in question may be made uniform or non-uniform between the coil segments depending on the region within the length K. This arrangement also can produce impedance variations with characteristics closer to a sine or cosine function curve, which can lessen the above-mentioned non-linearity between a detected phase angle θ and an actual distance (position) to be detected.

Figure 10A:
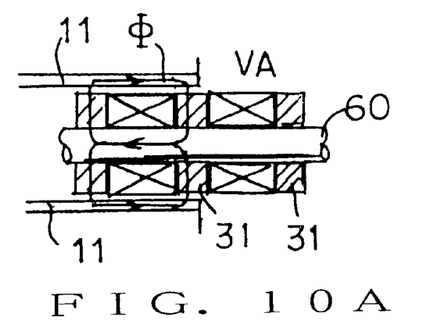
FIGS. 10A and 10B are schematic sectional views showing still other modified arrangements of the coils.
Figure 10B:
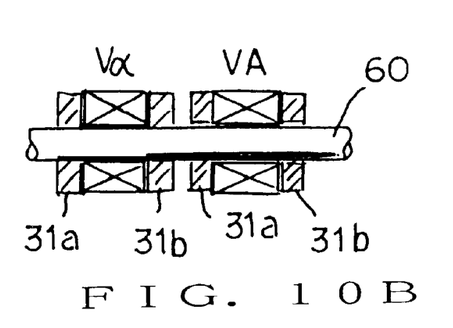

FIGS. 10A and 10B show modifications of the placement of the coils in the coil section 10 of FIG. 5, which are intended to prevent cross-talk between every adjoining coils and thereby enhance the detecting accuracy. In the modification of FIG. 10A, the coils Lα, LA–LD and Lβ are spaced from each other via magnetic spacers 31, so as to prevent spreading of the magnetic flux produced from the individual coils; namely, the magnetic flux from each of the coils follows a path denoted at Φ in the figure, along which it flows out from the interior of the coil, then passes a nearest end (i.e., the position of the magnetic spacer 31), outer periphery of the coil and another nearest end (i.e., the position of another magnetic spacer 31), and then returns to the interior of the coil. Such an arrangement effectively prevents the undesired cross-talk between the coils, which can greatly improve responsiveness (impedance variations) of the individual coils with respect to the presence of the magnetism-responsive substance 11 moving close to the outer periphery of the coils, thereby enhancing the detecting accuracy. Whereas only one magnetic spacer 31 is disposed between every adjoining coils in the example of FIG. 10A, two magnetic spacers 31a and 31b, slightly spaced from each other, may be disposed between every adjoining coils as illustrated in FIG. 10B. In the example of FIGS. 10A and 10B, a non-magnetic body may be used as a coil bobbin section 60 and a magnetic member such as a thin wire may be inserted in the center of the bobbin section 60 so as to facilitate a flow of the magnetic flux. The modifications of FIGS. 10A and 10B is also applicable to the embodiment of FIG. 1.

In each of the above-described embodiments of the present invention, the magnetism-responsive substance 11 may be formed by combining a magnetic material and an electric conductor, i.e. as a hybrid of opposite characteristics, rather than being formed of only one of the magnetic material and electric conductor. Further, the magnetism-responsive substance 11 may comprise a permanent magnet, and the coils of the coil section may contain an iron core. For example, the bobbin section 6 may have a magnetic rod 8 as shown in FIG. 1, and the permanent magnet used as the magnetism-responsive substance 11 may be a ring-shaped permanent magnet having an axial length at least equal to the coil length K. In such a case, as the permanent magnet, functioning as the magnetism-responsive substance 11, approaches any one of coils due to the movement of the piston member 3, a portion of the iron core having come close to the permanent magnet of the piston member 3 gets magnetically saturated or supersaturated, which results in a drop in the between-terminal voltage of the coil. Thus, even in the case where the permanent magnet is used as the magnetism-responsive substance 11, there takes place the same behavior as in the case where a nonmagnetic electric conductor is used as the magnetism-responsive substance 11; that is, the between-terminal voltage of the coil is caused to progressively decrease during displacement of the magnetism-responsive substance 11, i.e. the permanent magnet, from one end to the other of the coil.

Further, whereas each of the embodiments has been described above in relation to the stroke sensor which produces two A.C. output signals $\sin\theta \sin\omega t$ and $\cos\theta \sin\omega t$ having amplitude characteristics of sine and cosine functions (i.e., the so-called resolver-type stroke sensor producing two-phase output signals), the present invention is not so limited and may be designed to produce three or more A.C. output signals that have amplitude characteristics of three or more trigonometric functions presenting predetermined phrase differences (e.g., $\sin t \cdot \sin\omega t$, $\sin(\theta-120°) \cdot \sin\omega t$ and $\sin(\theta-240°) \cdot \sin\omega t$).

It should also be appreciated that in each of the embodiments, the number of the coils may be two or three or more than 4; just two or three coils will suffice in the case where the variation range of the phase component θ of the amplitude functions in the A.C. output signals can be a range of about 90° or 180° rather than the full 360° range.

As a modification of the present invention, the coils may be excited in plural phases using two-phase A.C. signals (e.g., $\sin\omega t$ and $\cos\omega t$), just as in conventional detector apparatus based on the phase-shift-type position detecting principles, so as to produce an A.C. output signal phase-shifted by a phase angle θ corresponding to a stroke position to be detected (e.g., $\sin(\omega t+\theta)$). For this purpose, two coil groups may be provided in parallel to each other, and these two coils are supplied with two A.C. signals of two different phases (e.g., $\sin\omega t$ and $\cos\omega t$), respectively, in such a manner that all the coils in each of the coil groups are excited by one of the A.C. signals. In such a case, an output $\cos\theta \sin\omega t$ is produced by performing analog arithmetic operations on the output from one of the coil groups while an output $\sin\theta\cos\omega t$ is produced by performing analog arithmetic operations on the output from the other coil group, and then there can be obtained a phase-shifted A.C. output signal $\sin(\omega t+\theta)$ by performing addition or subtraction between the two outputs.

Furthermore, in each of the above-described embodiments, the positional relationship between the coil section 10 and the magnetism-responsive substance 11 may be reversed; that is, the coil section 10 may be provided in the inner space 5 of the movable member, i.e. the piston member 3, and the magnetism-responsive substance 11 may be fixed to the sensor member 4.

Moreover, the inventive stroke sensor described in relation to the preferred embodiments may be applied to any apparatus for detecting a stroke position of a movable member other than the fluid-pressure cylinder, such as apparatus for detecting a spool position of a spool valve. Further, the inventive stroke sensor may be constructed as a large-size, heavy-duty detector apparatus in conformity with the size of an apparatus to which the stroke sensor is applied, or may be constructed as a compact stroke position detector apparatus.

In summary, the present invention having been described so far only requires primary coils and can eliminate a need for secondary coils, so that the present invention can provide a stroke sensor of simplified and inexpensive structure which can be readily reduced in size. Further, the present invention is characterized in that a plurality of the coil segments are arranged in series along the displacement direction of the object to be detected and variations in characteristics of the coil segments, i.e. progressively increasing (or progressively decreasing) variations in the respective between-terminal voltages of the coil segments, occur sequentially as the tip of the magnetism-responsive substance moves from one end to the other of any one of the coils. Thus, by taking out the respective between-terminal voltages of the coil segments and then combining them through addition and/or subtraction therebetween, there can be readily produced a plurality of A.C. output signals that present respective amplitudes of predetermined cyclic function characteristics (e.g., two A.C. output signals that present respective amplitudes of sine and cosine function characteristics) in response to a current position of the object to be detected; thus, a wider available phase angle range can be provided by the present invention. For example, the present invention permits detection over the full 0°–360° phase angle range, as described above. Further, by detecting, from a correlation between the amplitude values in the plurality of A.C. output signals, phase values in the predetermined cyclic functions (e.g., sine and cosine functions) defining the amplitude values, the present invention achieves high-resolution detection even when displacement of the object to be detected is very minute.

What is claimed is:

1. A stroke sensor for detecting a stroke position of a movable member linearly movable relative to a body within a space formed in said body, said stroke sensor comprising:
    a sensor member having one end supported in a cantilever fashion adjacent a predetermined end of said body and having another end extending into the space of said body, said movable member having an inner space formed therein to permit entry of said sensor member into said movable member;
    a coil section having a plurality of coil segments excitable by a predetermined A.C. signal and sequentially arranged along a direction of linear movement of said movable member, said coil section being provided on one of said sensor member and an inner peripheral wall of said movable member defining said inner space; and
    a magnetism-responsive substance provided on other of said sensor member and the inner peripheral wall of said movable member defining said inner space in such a manner that said magnetism-responsive substance is movable relative to said coil section, wherein relative positions of said magnetism-responsive substance and said coil section vary in accordance with a stroke position of said movable member, in response to which respective inductance of said coil segments are caused to vary in such a manner that during movement of said magnetism-responsive substance from one end to another of a particular one of said coil segments, a voltage across the particular coil segment is caused to progressively decrease or increase.

2. A stroke sensor as claimed in claim 1 which further comprises an arithmetic operator that takes out the respective voltages of said coil segments and performs addition and/or subtraction between the voltages of said coil segments to thereby generate an A.C. output signal presenting a particular amplitude based on a predetermined cyclic function characteristic in accordance with the stroke position of said movable member.

3. A stroke sensor as claimed in claim 2 wherein said arithmetic operator generates a plurality of A.C. output signals presenting particular amplitudes based on predetermined cyclic function characteristics in accordance with the stroke position of said movable member, and the cyclic function characteristics defining respective ones of the amplitudes of the plurality of A.C. output signals comprising cyclic functions of a same characteristic which are shifted from each other by a predetermined phase amount.

4. A stroke sensor as claimed in claim 3 which further comprises an amplitude-to-phase conversion section that receives the plurality of A.C. output signals generated by said arithmetic operator and detects, from a correlation between amplitude values in the plurality of A.C. output signals, particular phase values in the predetermined cyclic functions defining the amplitude values, to generate data indicative of the position of said movable member to be detected on the basis of the detected particular phase values.

5. A stroke sensor as claimed in claim 3 wherein said plurality of A.C. output signals include an A.C. output signal presenting an amplitude of a sine function characteristic in accordance with the stroke position of said movable member and an A.C. output signal presenting an amplitude of a cosine function characteristic in accordance with the stroke position of said movable member.

6. A stroke sensor as claimed in claim 1 wherein said coil section is provided on said sensor member and said magnetism-responsive substance is provided on the inner peripheral wall of said movable member defining said inner space.

7. A stroke sensor as claimed in claim 6 wherein said sensor member includes a bobbin section containing a magnetic body and each of said coil segments of said coil section is fitted in said bobbin section.

8. A stroke sensor as claimed in claim 7 wherein said bobbin section includes a cylindrical portion made of a nonmagnetic material, and one or more magnetic rods received within said cylindrical portion.

9. A stroke sensor as claimed in claim 6 wherein said magnetic body or each of said one or more magnetic rods has an electrically-conductive coating formed thereon.

10. A stroke sensor as claimed in claim 6 wherein said sensor member includes a core rod having said coil section fitted therein, and a magnetic spacer interposed between opposed ends of each adjoining pair of said coil segments.

11. A stroke sensor as claimed in claim 6 wherein a material of said movable member itself comprises said magnetism-responsive substance.

12. A stroke sensor as claimed in claim 1 wherein said magnetism-responsive substance includes at least one of a magnetic material and an electrically-conductive material.

13. A stroke sensor as claimed in claim 1 wherein said coil section comprises substantially a single coil extending along the direction of linear movement of said movable member, and a plurality of output terminals are provided at predetermined intermediate positions of the single coil so that said plurality of coil segments are formed by said single coil.

* * * * *